United States Patent
Kong et al.

(10) Patent No.: US 12,552,927 B2
(45) Date of Patent: *Feb. 17, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Seonho Kong, Daejeon (KR); Gun Ko, Daejeon (KR); Sun Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 544 days.

This patent is subject to a terminal disclaimer.

(21) Appl. No.: 18/019,558

(22) PCT Filed: Aug. 22, 2022

(86) PCT No.: PCT/KR2022/012540
§ 371 (c)(1),
(2) Date: Feb. 3, 2023

(87) PCT Pub. No.: WO2023/033431
PCT Pub. Date: Mar. 9, 2023

(65) Prior Publication Data
US 2024/0254329 A1    Aug. 1, 2024

(30) Foreign Application Priority Data

Sep. 2, 2021 (KR) .......... 10-2021-0116823
Aug. 12, 2022 (KR) .......... 10-2022-0101011

(51) Int. Cl.
*C08L 67/02* (2006.01)
(52) U.S. Cl.
CPC .......... *C08L 67/02* (2013.01); *C08L 2205/025* (2013.01); *C08L 2205/035* (2013.01)
(58) Field of Classification Search
CPC .................................................. C08L 67/02
See application file for complete search history.

(56) References Cited

U.S. PATENT DOCUMENTS

| | | | |
|---|---|---|---|
| 5,219,915 A | 6/1993 | McKee et al. | |
| 6,242,519 B1 * | 6/2001 | Cheret | C08L 67/02 |
| | | | 524/451 |
| 6,689,838 B1 | 2/2004 | Fischer et al. | |
| 8,362,136 B2 | 1/2013 | Eipper et al. | |
| 9,416,235 B2 | 8/2016 | Nonaka et al. | |
| 10,501,622 B2 * | 12/2019 | Park | C08L 67/02 |
| 10,836,113 B2 | 11/2020 | Yamanaka | |
| 2011/0144239 A1 * | 6/2011 | Lee | C08L 67/02 |
| | | | 523/522 |
| 2017/0240727 A1 | 8/2017 | Van Der Burgt et al. | |

FOREIGN PATENT DOCUMENTS

| | | |
|---|---|---|
| CN | 1993423 A | 7/2007 |
| CN | 103974811 A | 8/2014 |
| CN | 107075170 A | 8/2017 |
| CN | 107206703 A | 9/2017 |
| JP | 2016-137713 | 8/2016 |
| JP | 6668768 | 3/2020 |
| KR | 10-0199159 | 6/1999 |
| KR | 10-2002-0016845 | 3/2002 |
| KR | 10-2005-0092692 | 9/2005 |
| KR | 10-1192871 | 10/2012 |
| KR | 10-2014-0099517 | 8/2014 |
| KR | 10-2017-0039015 | 4/2017 |
| KR | 10-2017-0072213 | 6/2017 |
| KR | 10-2019-0027115 | 3/2019 |
| KR | 10-2001482 | 7/2019 |
| WO | 0100729 | 1/2001 |
| WO | 2016062774 | 4/2016 |

* cited by examiner

*Primary Examiner* — Michael F Pepitone
(74) *Attorney, Agent, or Firm* — Bryan Cave Leighton Paisner LLP

(57) ABSTRACT

Provided is a thermoplastic resin composition, a method of preparing the same, and a molded article including the same. The composition includes 35 to 50 wt % of a polybutylene terephthalate resin (A) having an intrinsic viscosity of 0.6 to 0.9 dl/g; 5 to 15 wt % of a polyethylene terephthalate homopolymer (B); 7 to 9 wt % of an acrylate-aromatic vinyl compound-vinyl cyanide compound graft copolymer (C) including 23 to 35 wt % of a vinyl cyanide compound; 7 to 12 wt % of an aromatic vinyl compound-vinyl cyanide compound copolymer (D) including 26 to 40 wt % of a vinyl cyanide compound; and 20 to 37 wt % of glass fiber (E) including 50 to 70 wt % of silica ($SiO_2$).

Because the composition has excellent heat resistance, fluidity, and impact strength, tensile strength, flexural strength, and flexural modulus, it is applicable to manufacture of automotive exterior materials and parts for automotive electric/electronic equipment.

12 Claims, No Drawings

THERMOPLASTIC RESIN COMPOSITION, METHOD OF PREPARING THE SAME, AND MOLDED ARTICLE INCLUDING THE SAME

CROSS-REFERENCE TO RELATED APPLICATIONS

This application is a National Stage Application of International Application No. PCT/KR2022/012540 filed on Aug. 22, 2022, which claims priority to Korean Patent Application No. 10-2021-0116823, filed on Sep. 2, 2021, and Korean Patent Application No. 10-2022-0101011, re-filed on Aug. 12, 2022, in the Korean Intellectual Property Office, the disclosures of each of which are incorporated herein by reference.

TECHNICAL FIELD

The present invention relates to a thermoplastic resin composition, a method of preparing the same, and a molded article including the same. More particularly, the present invention relates to a high-quality thermoplastic resin composition having excellent heat resistance, fluidity, and mechanical properties and thus, being applicable to manufacture of automotive exterior materials and parts for automotive electric/electronic equipment, a method of preparing the thermoplastic resin composition, and a molded article including the thermoplastic resin composition.

BACKGROUND

Among engineering plastics, a polybutylene terephthalate (hereinafter referred to as "PBT") resin is a crystalline material and has a fast crystallization rate and an appropriate molding temperature range. In addition, the PBT resin has physical property balance superior to that of other materials. Due to these advantages, the PBT resin has been applied to various fields such as automobiles, electric/electronic devices, and office equipment.

However, a PBT resin has low impact strength at room temperature, and the impact strength thereof is further reduced at low temperature (−1 to −50° C.). To solve these drawbacks, PBT materials containing additives such as glass fiber or rubber or an impact modifier are mainly used.

However, in a PBT resin, due to the trade-off relationship between impact strength and fluidity, when impact strength is increased, fluidity is reduced.

Therefore, it is necessary to develop a material having excellent heat resistance, which is the advantage of the PBT material, and excellent impact strength, particularly low-temperature impact strength, and fluidity.

RELATED ART DOCUMENTS

Patent Documents

KR 0199159 B1

BRIEF DESCRIPTION

Technical Problem

Therefore, the present invention has been made in view of the above problems, and it is one object of the present invention to provide a thermoplastic resin composition having excellent heat resistance, fluidity, and mechanical properties.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$).

In addition, the present invention can provide a thermoplastic resin composition including 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70 by weight of silica ($SiO_2$), wherein the thermoplastic resin composition has a melt flow rate of 10 g/10 min or more as measured at 260° C. under a load of 2.16 kg according to ISO 1133.

In addition, the present invention can provide a thermoplastic resin composition including 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$), wherein the thermoplastic resin composition has a notched Izod impact strength of 6 KJ/m² or more as measured at a low temperature (−30° C.) using a notched specimen having a thickness of 4 mm according to ISO 180/1A.

In accordance with another aspect of the present invention, provided is a method of preparing a thermoplastic resin composition, the method including melt-kneading and extruding, at 200 to 300° C. and 100 to 300 rpm, 35 to 50 by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$).

In addition, the present invention can provide a method of preparing a thermoplastic resin composition, the method including melt-kneading and extruding, at 200 to 300° C. and 100 to 300 rpm, 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$), wherein the prepared thermoplastic resin composition has a melt flow rate of 10 g/10 min or more as measured at 260° C. under a load of 2.16 kg according to ISO 1133.

The polyethylene terephthalate homopolymer (B) can have an intrinsic viscosity of preferably 0.6 to 1.2 dl/g.

The acrylate-aromatic vinyl compound-vinyl cyanide compound graft copolymer can be preferably a graft copolymer including 23 to 35% by weight of a vinyl cyanide compound, 30 to 45% by weight of acrylate-based rubber containing an acrylate, and 25 to 40% by weight of an aromatic vinyl compound.

The thermoplastic resin composition can include preferably 4.1 to 5.5% by weight of a vinyl cyanide compound based on a total weight thereof.

The glass fiber (E) can include preferably 50 to 70% by weight of silica ($SiO_2$), 16 to 30% by weight of aluminum oxide ($Al_2O_3$), 5 to 25% by weight of calcium oxide (CaO), and 5 to 20% by weight other components, including MgO.

The glass fiber (E) can have an average particle diameter of preferably 3 to 25 μm and an average length of preferably 1 to 15 mm.

The thermoplastic resin composition can include preferably one or more selected from the group consisting of an antioxidant, a lubricant, and a transesterification inhibitor.

In addition, the present invention can provide a method of preparing a thermoplastic resin composition, the method including melt-kneading and extruding, at 200 to 300° C. and 100 to 300 rpm, 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$), wherein the prepared thermoplastic resin composition has a notched Izod impact strength of 6 KJ/$m^2$ or more as measured at a low temperature (−30° C.) using a notched specimen having a thickness of 4 mm according to ISO 180/1A.

In accordance with yet another aspect of the present invention, provided is a molded article including the thermoplastic resin composition.

Advantageous Effects

According to the present invention, provided is a high-quality thermoplastic resin composition having excellent heat resistance and excellent fluidity and mechanical properties such as impact strength at high and low temperatures, tensile strength, and flexural strength and thus, being applicable to manufacture of automotive exterior materials and parts for automotive electric/electronic equipment, a method of preparing the thermoplastic resin composition, and a molded article including the thermoplastic resin composition.

DETAILED DESCRIPTION

Hereinafter, a thermoplastic resin composition, a method of preparing the same, and a molded article including the same according to the present invention will be described in detail.

The present inventors confirmed that, when a polybutylene terephthalate resin having a predetermined intrinsic viscosity, a polyethylene terephthalate homopolymer, an acrylate-aromatic vinyl compound-vinyl cyanide compound graft copolymer, an aromatic vinyl compound-vinyl cyanide compound copolymer, and glass fiber were included in a predetermined content ratio, and the content of a vinyl cyanide compound in the acrylate-aromatic vinyl compound-vinyl cyanide compound graft copolymer, the content of a vinyl cyanide compound in the aromatic vinyl compound-vinyl cyanide compound copolymer, and the content of silica in the glass fiber were adjusted within a predetermined range, heat resistance was excellent, and fluidity and mechanical properties such as impact strength and tensile strength were improved. Based on these results, the present inventors conducted further studies to complete the present invention.

The thermoplastic resin composition according to the present invention will be described in detail as follows.

The thermoplastic resin composition of the present invention includes 5 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$). In this case, the thermoplastic resin composition can have excellent heat resistance, fluidity, and mechanical properties such as impact strength, tensile strength, flexural strength, and flexural modulus, and thus can be suitable for automotive exterior materials and parts for automotive electric/electronic equipment.

Hereinafter, each component of the thermoplastic resin composition of the present invention will be described in detail.

(A) Polybutylene Terephthalate Resin

For example, based on a total weight of the thermoplastic resin composition, the polybutylene terephthalate resin (A) can be included in an amount of 35 to 50% by weight, preferably 37 to 47% by weight, more preferably 38 to 45% by weight, still more preferably 38 to 42% by weight. Within this range, mechanical properties such as impact strength, tensile strength, elongation, flexural strength, and flexural modulus, fluidity, and heat resistance can be excellent.

The polybutylene terephthalate resin (A) can have an intrinsic viscosity of preferably 0.6 to 0.9 dl/g, more preferably 0.65 to 0.9 dl/g, still more preferably 0.75 to 0.85 dl/g. Within this range, due to proper melt index, processability, injection processability, and molding stability can be excellent.

In the present disclosure, when intrinsic viscosity is measured, unless noted otherwise, a sample to be measured is completely dissolved in methylene chloride, and then is filtered using a filter to obtain a filtrate. Then, using the obtained filtrate, intrinsic viscosity is measured at 20° C. using a Ubbelohde viscometer.

As the polybutylene terephthalate resin (A), a conventional polybutylene terephthalate resin can be used without particular limitation. For example, the polybutylene terephthalate resin (A) can be a polymer obtained by condensation polymerization of 1,4-butanediol and dimethyl terephthalate.

A method of preparing a polybutylene terephthalate resin commonly practiced in the art to which the present invention pertains can be used to prepare the polybutylene terephthalate resin (A).

(B) Polyethylene Terephthalate Homopolymer

For example, based on a total weight of the thermoplastic resin composition, the polyethylene terephthalate homopolymer (B) can be included in an amount of 5 to 15% by weight, preferably 7 to 14% by weight, more preferably 9 to 13% by weight, still more preferably 10 to 13% by weight. Within this range, mechanical properties and fluidity can be excellent, and appearance can be improved.

In the present disclosure, polyethylene terephthalate homopolymers commonly used in the art to which the present invention pertains can be used as the polyethylene terephthalate homopolymer of the present invention without particular limitation. For example, the polyethylene terephthalate homopolymer refers to a polymer obtained by condensation polymerization of a diacid compound as a monomer and a di-alcohol, specifically a polymer obtained by condensation polymerization of terephthalic acid or terephthalic acid dimethyl and ethylene glycol.

The polyethylene terephthalate homopolymer (B) can have an intrinsic viscosity of preferably 0.6 to 1.2 dl/g, more preferably 0.6 to 1.1 dl/g, still more preferably 0.6 to 1 dl/g, still more preferably 0.7 to 0.9 dl/g. Within this range, due to proper melt index, processability, injection processability, and molding stability can be excellent.

(C) Acrylate-Aromatic Vinyl Compound-Vinyl Cyanide Compound Graft Copolymer

For example, based on a total weight of the thermoplastic resin composition, the graft copolymer (C) can be included in an amount of 7 to 9% by weight, preferably 7.5 to 8.5% by weight. Within this range, fluidity and mechanical properties, particularly impact strength at room temperature and low temperature, can be excellent, and heat resistance can also be excellent.

The acrylate-aromatic vinyl compound-vinyl cyanide compound graft copolymer (C) can be a graft copolymer including preferably 23 to 35% by weight, more preferably 25 to 33% by weight of a vinyl cyanide compound. Within this range, mechanical properties, particularly impact strength at room temperature and low temperature, can be excellent, and heat resistance can also be excellent.

For example, the graft copolymer (C) can be a graft copolymer including 23 to 35% by weight of a vinyl cyanide compound, 30 to 45% by weight of acrylate-based rubber, and 25 to 40% by weight of an aromatic vinyl compound, preferably a graft copolymer including 25 to 33% by weight of a vinyl cyanide compound, 35 to 43% by weight of acrylate-based rubber, and 30 to 37% by weight of an aromatic vinyl compound, more preferably a graft copolymer including 25 to 31% by weight of a vinyl cyanide compound, 38 to 43% by weight of acrylate-based rubber, and 30 to 35% by weight of an aromatic vinyl compound.

Within this range, fluidity and mechanical properties, particularly impact strength at room temperature and low temperature, can be excellent, and heat resistance can also be excellent.

For example, the acrylate-based rubber is acrylate-containing rubber, and can have an average particle diameter of 400 to 2,500 Å, preferably 500 to 2,000 Å, more preferably 700 to 1,500 Å. Within this range, especially at room temperature and low temperature, impact strength can be excellent.

In the present disclosure, average particle diameter can be measured by dynamic light scattering, and specifically, can be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 usec.

For example, the graft copolymer (C) can have a grafting degree of 20 to 60%, preferably 25 to 55%, more preferably 30 to 50%, still more preferably 30 to 40%. Within this range, especially at room temperature and low temperature, impact strength can be excellent.

In the present disclosure, when a grafting degree is measured, graft polymer latex is coagulated, washed, and dried to obtain powdered graft polymer latex, and 30 ml of acetone is added to 2 g of the powdered graft polymer latex, followed by stirring for 24 hours. Then, ultracentrifugation is performed to separate insoluble matter that is not dissolved in acetone, followed by drying at 60 to 120° C. Then, the weight of the insoluble matter is measured. The measured value is substituted into Equation 1 below to calculate a grafting degree.

$$\text{Grafting degree (\%)} = [\text{Weight (g) of grafted monomers/Rubber weight (g)}] \times 100 \quad \text{[Equation 1]}$$

In Equation 1, the weight of grafted monomers (g) is obtained by subtracting rubber weight (g) from the weight of insoluble substances (gel) obtained by dissolving a graft copolymer in acetone and performing centrifugation, and the rubber weight (g) is the weight (g) of rubber components theoretically added to graft copolymer powder.

In the present disclosure, a polymer including a certain compound means a polymer prepared by polymerizing the compound, and a unit in the polymer is derived from the compound.

For example, the acrylate of the present invention can include one or more selected from the group consisting of alkyl acrylates containing an alkyl group having 2 to 8 carbon atoms, preferably an alkyl acrylate containing an alkyl group having 4 to 8 carbon atoms, still more preferably butyl acrylate, ethylhexyl acrylate, or a mixture thereof.

For example, the vinyl cyanide compound of the present invention can include one or more selected from the group consisting of acrylonitrile, methacrylonitrile, ethylacrylonitrile, and isopropylacrylonitrile, preferably acrylonitrile.

For example, the aromatic vinyl compound of the present invention can include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably styrene.

Preparation methods commonly used in the art to which the present invention pertains can be used to prepare the graft copolymer (C) without particular limitation. For example, the graft copolymer (C) can be prepared by suspension polymerization, emulsion polymerization, solution polymerization, or bulk polymerization, preferably emulsion polymerization.

(D) Aromatic Vinyl Compound-Vinyl Cyanide Compound Copolymer

For example, based on a total weight of the thermoplastic resin composition, the aromatic vinyl compound-vinyl cyanide compound copolymer (D) can be included in an amount of 7 to 12% by weight, preferably 7 to 11% by weight, more preferably 8 to 10% by weight, still more preferably 8 to 9% by weight. Within this range, fluidity and mechanical properties, particularly flexural modulus, can be excellent, and heat deflection temperature can be excellent at both high and low loads.

The aromatic vinyl compound-vinyl cyanide compound copolymer (D) can be a copolymer including preferably 26 to 40% by weight, more preferably 26 to 35% by weight, still more preferably 27 to 32% by weight of a vinyl cyanide compound. Within this range, fluidity and mechanical properties, particularly flexural modulus, can be excellent, and heat deflection temperature can be excellent at both high and low loads.

For example, the aromatic vinyl compound-vinyl cyanide compound copolymer (D) can have a weight average molecular weight of 100,000 to 180,000 g/mol, preferably 110,000 to 170,000 g/mol, more preferably 120,000 to 150,000 g/mol. Within this range, mechanical properties and friction resistance can be maintained at a certain level, and processability and injection stability can be excellent.

In the present disclosure, weight average molecular weight can be measured using tetrahydrofuran (THF) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies). More specifically, weight average molecular weight is measured through gel permeation chromatography (GPC, Waters 2410 RI detector, 515 HPLC pump, 717 auto sampler). 0.02 g of each polymer is dissolved in 20 ml of tetrahydrofuran (THE), filtered using a 0.45 μm filter, and placed in a GPC vial (4 ml) to prepare each sample. From 1 hour before start of measurement, the solvent (THF) is injected at a rate of 1.0 mL/min, and measurement is performed under conditions of a measurement time of 25 minutes, an injection volume of 150 μL, a flow rate of 1.0 ml/min, an isocratic pump mode, and an RI detector (condition: 40). At this time, calibration can be performed using a polystyrene standard (PS), and data processing can be performed using ChemStation.

For example, the aromatic vinyl compound-vinyl cyanide compound copolymer (D) can be a styrene-acrylonitrile copolymer (SAN resin), an α-methylstyrene-acrylonitrile copolymer (heat-resistant SAN resin), or a mixture thereof, more preferably a styrene-acrylonitrile copolymer (SAN resin). In this case, heat resistance can be excellent at both high and low loads while mechanical properties and fluidity are maintained at a certain level.

Preparation methods commonly used in the art to which the present invention pertains can be used to prepare the aromatic vinyl compound-vinyl cyanide compound copolymer (D) without particular limitation. For example, the aromatic vinyl compound-vinyl cyanide compound copolymer (D) can be prepared by suspension polymerization, emulsion polymerization, solution polymerization, or bulk polymerization, preferably bulk polymerization. In this case, heat resistance and fluidity can be excellent.

(E) Glass Fiber

For example, based on a total weight of the thermoplastic resin composition, the glass fiber (E) can be included in an amount of 20 to 37% by weight, preferably 23 to 37% by weight, more preferably 25 to 35% by weight, still more preferably 28 to 32% by weight. Within this range, fluidity, mechanical properties, and heat resistance can be excellent.

Based on a total weight thereof, the glass fiber (E) can include silica ($SiO_2$) in an amount of preferably 50 to 70% by weight, more preferably 51 to 65% by weight, still more preferably 51 to 58% by weight. Within this range, tensile strength, flexural strength, and flexural modulus can be excellent while fluidity and impact strength are maintained, and heat resistance can be excellent, especially at a low load.

Specifically, the glass fiber (E) can be preferably glass fiber including 50 to 70% by weight of silica ($SiO_2$), 16 to 30% by weight of aluminum oxide ($Al_2O_3$), 5 to 25% by weight of calcium oxide (CaO), and 5 to 20% by weight of other components, including MgO, more preferably glass fiber including 51 to 65% by weight of silica ($SiO_2$), 17 to 28% by weight of aluminum oxide ($Al_2O_3$), 10 to 24% by weight of calcium oxide (CaO), and 8 to 18% by weight of other components, including MgO, still more preferably glass fiber including 51 to 58% by weight of silica ($SiO_2$), 17 to 24% by weight of aluminum oxide ($Al_2O_3$), 15 to 22% by weight of calcium oxide (CaO), and 10 to 15% by weight of other components, including MgO. Within this range, tensile strength, flexural strength, and flexural modulus can be excellent while fluidity and impact strength are maintained, and heat resistance can be excellent, especially at a low load.

The other components, including MgO, can include one or more selected from the group consisting of MgO, $Na_2O$, $K_2O$, $Li_2O$, $Fe_2O_3$, $B_2O_3$, and SrO.

For example, the glass fiber (E) can have an average diameter of 3 to 25 μm, preferably 5 to 20 μm, more preferably 8 to 15 μm. Within this range, due to improvement in compatibility with resins, mechanical strength can be increased, and a final product can have excellent appearance.

For example, the glass fiber (E) can have an average length of 1 to 15 mm, preferably 2 to 7 mm, more preferably 2.5 to 5 mm. Within this range, due to improvement in compatibility with resins, mechanical strength can be increased, and a final product can have excellent appearance.

In the present disclosure, when the average length and average diameter of glass fiber are measured, the length and diameter of 30 glass fibers are measured using a scanning electron microscope (SEM), and an average value thereof is calculated.

For example, the glass fiber (E) can be chopped glass fiber. In this case, compatibility can be excellent.

In the present disclosure, chopped glass fiber commonly used in the art to which the present invention pertains can be used in the present invention without particular limitation.

For example, the glass fiber (E) can have an aspect ratio (L/D) of average length (L) to average diameter (D) of 200 to 550, preferably 220 to 450, more preferably 250 to 350, still more preferably 270 to 320. Within this range, due to improvement in compatibility with resins, excellent appearance can be implemented.

For example, the glass fiber (E) can be surface-treated with a silane-based compound or a urethane-based compound, preferably a surface treatment agent including one or more selected from the group consisting of an amino silane-based compound, an epoxy silane-based compound, and a urethane-based compound, more preferably an epoxy silane-based compound. In this case, compatibility can be improved, the glass fiber can be evenly dispersed in a resin composition, thereby improving mechanical strength.

For example, based on 100% by weight in total of the surface-treated glass fiber (glass fiber+surface treatment agent), the surface treatment agent can be included in an amount of 0.1 to 10% by weight, preferably 0.1 to 5% by weight, more preferably 0.1 to 3% by weight, still more preferably 0.1 to 0.8% by weight, still more preferably 0.2 to 0.5% by weight. Within this range, mechanical properties, physical property balance, and the appearance of a final product can be excellent.

As the amino silane-based compound, an amino silane generally used as a coating agent for glass fiber can be used without particular limitation. For example, the amino silane-based compound can include one or more selected from the group consisting of gamma-glycidoxypropyl triethoxy silane, gamma-glycidoxypropyl trimethoxy silane, gamma-glycidoxypropyl methyldiethoxy silane, gamma-glycidoxypropyl triethoxy silane, 3-mercaptopropyl trimethoxy silane, vinyltrimethoxysilane, vinyltriethoxy silane, gamma-methacryloxypropyl trimethoxy silane, gamma-methacryloxypropyl triethoxy silane, gamma-aminopropyl trimethoxy silane, gamma-aminopropyl triethoxy silane, 3-isocyanate propyltriethoxy silane, gamma-acetoacetatepropyl trimethoxysilane, acetoacetatepropyl triethoxy silane, gamma-cyanoacetyl trimethoxy silane, gamma-cyanoacetyl triethoxy silane, and acetoxyaceto trimethoxy silane. In this case, mechanical properties, heat resistance, and the surface properties of an extruded product can be excellent.

As the epoxy silane-based compound, an epoxy silane generally used as a coating agent for glass fiber can be used without particular limitation. For example, the epoxy silane-based compound can include one or more selected from the group consisting of 3-glycidyloxypropyltrimethoxysilane, 3-glycidyloxypropyl-triethoxysilane, 3-glycidyloxypropyl (dimethoxy)-methylsilane, and 2-(3,4-epoxycyclohexyl)-ethyltrimethoxysilane. In this case, mechanical properties, heat resistance, and the surface properties of an extruded product can be excellent.

The glass fiber (E) can be appropriately selected within the range commonly used in the art according to the definition of the present invention, and the cross-sectional shape thereof can have a cylindrical shape, an oval shape, or the like, without particular limitation.

In the present disclosure, the total weight of the thermoplastic resin composition of the present invention means a total weight of the polybutylene terephthalate resin (A), the polyethylene terephthalate homopolymer (B), the acrylate-aromatic vinyl compound-vinyl cyanide compound graft copolymer (C), the aromatic vinyl compound-vinyl cyanide compound copolymer (D), and the glass fiber (E).

Additives

For example, the thermoplastic resin composition can include one or more additives selected from the group consisting of an antioxidant, a lubricant, and a transesterification inhibitor. In this case, processability, light resistance, and mechanical properties can be improved.

For example, the antioxidant can be a phenol-based antioxidant, a phosphorus-based antioxidant, or a mixture thereof, preferably a phenol-based antioxidant. In this case, oxidation by heat can be prevented during an extrusion process, and mechanical properties and heat resistance can be excellent.

For example, the phenol-based antioxidant can include one or more selected from the group consisting of N, N'-hexane-1,6-diyl-bis [3-(3,5-di-t-butyl-4-hydroxyphenyl propionamide)], pentaerythritol tetrakis [3-(3,5-di-t-butyl-4-hydroxyphenyl) propionate], N, N'-hexamethylene-bis (3,5-di-t-butyl-4-hydroxy-hydrocinnamamide), triethylene glycol-bis [3-(3-t-butyl-5-methyl-4-hydroxyphenyl) propionate], 3,5-di-t-butyl-4-hydroxybenzylphosphonate-diethylester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl) isocyanurate. In this case, heat resistance can be greatly improved while physical property balance is maintained.

For example, the phosphorus-based antioxidant can include one or more selected from the group consisting of triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, dodecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)-pentaerythritol diphosphite, 2,2-methylene-bis(4,6-di-tert-butylphenyl) octylphosphite, bis (nonylphenyl) pentaerythritol diphosphite, bis(2,4-di-tert-butylphenyl) pentaerythritol diphosphite, stearyl pentaerythritol diphosphite, tributylphosphate, triethylphosphate, and trimethylphosphate.

Based on a total weight of the thermoplastic resin composition, the antioxidant can be included in an amount of preferably 0.05 to 1% by weight, more preferably 0.1 to 0.8% by weight, still more preferably 0.2 to 0.6% by weight. Within this range, physical property balance can be excellent, and heat resistance can be improved.

When the additives are included in the thermoplastic resin composition, the total weight of the thermoplastic resin composition of the present invention means a total weight of the polybutylene terephthalate resin (A), the polyethylene terephthalate homopolymer (B), the acrylate-aromatic vinyl compound-vinyl cyanide compound graft copolymer (C), the aromatic vinyl compound-vinyl cyanide compound copolymer (D), the glass fiber (E), the antioxidant, the lubricant, and the transesterification inhibitor.

For example, the lubricant can include one or more selected from the group consisting of polyethylene-based wax, a sodium-neutralized ethylene-methacrylic acid copolymer, and sodium-neutralized montanic acid wax, preferably polyethylene-based wax, more preferably oxidized high-density polyethylene wax. In this case, heat resistance and fluidity can be improved.

The polyethylene-based wax has polarity and penetrates between polymers to allow chains to slide well and to induce intermolecular flow.

For example, based on a total weight of the thermoplastic resin composition, the lubricant can be included in an amount of 0.1 to 5% by weight, preferably 0.1 to 3% by weight, more preferably 0.2 to 1% by weight, still more preferably 0.2 to 0.5% by weight. Within this range, mechanical properties can be excellent, and heat resistance and fluidity can be improved.

For example, the transesterification inhibitor can be a metal phosphate-based compound, and can include preferably one or more selected from the group consisting of sodium phosphate monobasic, potassium phosphate monobasic, sodium phosphate dibasic, potassium phosphate dibasic, sodium phosphate tribasic, potassium phosphate tribasic, and calcium phosphate, more preferably sodium phosphate monobasic. In this case, physical property balance can be excellent, and mechanical properties and fluidity can be improved.

For example, based on a total weight of the thermoplastic resin composition, the transesterification inhibitor can be included in an amount of 0.01 to 3% by weight, preferably 0.01 to 2% by weight, more preferably 0.05 to 1% by weight, still more preferably 0.05 to 0.5% by weight. Within this range, physical property balance can be excellent, and mechanical properties and fluidity can be improved.

When necessary, the thermoplastic resin composition can further include one or more selected from the group consisting of a UV stabilizer, a dye, a pigment, a flame retardant, and an inorganic filler. In this case, based on 100 parts by weight in total of the thermoplastic resin composition (polybutylene terephthalate resin (A)+polyethylene terephthalate homopolymer (B)+acrylate-aromatic vinyl compound-vinyl cyanide compound graft copolymer (C)+aromatic vinyl compound-vinyl cyanide compound copolymer (D)+glass fiber (E)), the additives can be included in an amount of 0.01 to 5 parts by weight, preferably 0.05 to 3 parts by weight, more preferably 0.1 to 2 parts by weight, still more preferably 0.5 to 1 part by weight. Within this range, required physical properties can be efficiently expressed without deterioration of the intrinsic properties of the thermoplastic resin composition of the present invention.

UV stabilizers, dyes, pigments, flame retardants, and inorganic fillers commonly used in the art to which the present invention pertains can be used in the present invention without particular limitation.

Thermoplastic Resin Composition

For example, based on a total weight thereof (polybutylene terephthalate resin (A)+polyethylene terephthalate homopolymer (B)+acrylate-aromatic vinyl compound-vinyl cyanide compound graft copolymer (C)+aromatic vinyl compound-vinyl cyanide compound copolymer (D)+glass fiber (E)), the thermoplastic resin composition can include a vinyl cyanide compound in an amount of 4.1 to 5.5% by weight, preferably 4.1 to 5% by weight, more preferably 4.2 to 4.8% by weight. Within this range, fluidity, mechanical properties, and heat resistance can be excellent.

The thermoplastic resin composition can have a heat deflection temperature of preferably 205° C. or higher, more preferably 210° C. or higher, still more preferably 210 to 230° C., still more preferably 210 to 220° C. as measured under a low load of 0.45 MPa according to ISO 75. Within this range, balance of all physical properties can be excellent, and in particular, heat resistance can be excellent under a low load.

The thermoplastic resin composition can have a heat deflection temperature of preferably 180° C. or higher, more preferably 190° C. or higher, still more preferably 190 to 200° C. as measured under a high load of 1.80 MPa according to ISO 75. Within this range, balance of all physical properties can be excellent, and in particular, heat resistance can be excellent under a high load.

The thermoplastic resin composition can have a melt flow rate of preferably 10 g/10 min or more, more preferably 11 g/10 min or more, still more preferably 12 g/10 min or more, still more preferably 12.5 g/10 min or more, still more preferably 12.5 to 19.5 g/10 min, still more preferably 12.5 to 18 g/10 min as measured at 260° C. under a load of 2.16 kg according to ISO 1133. Within this range, balance of all physical properties can be excellent, and processability and injection moldability can be excellent.

The thermoplastic resin composition can have an Izod impact strength of preferably 7 KJ/m$^2$ or more, more preferably 8 KJ/m$^2$ or more, still more preferably 8 to 11 KJ/m$^2$, still more preferably 8.4 to 10 KJ/m$^2$ as measured at room temperature using a notched specimen having a thickness of 4 mm according to ISO 180/1A. Within this range, balance of all physical properties and mechanical strength can be excellent.

In the present disclosure, room temperature can be within the range of 20±5° C.

The thermoplastic resin composition can have a notched Izod impact strength of preferably 6 kJ/m$^2$ or more, more preferably 7 KJ/m$^2$ or more, still more preferably 7 to 10 KJ/m$^2$, still more preferably 7.5 to 9 kJ/m$^2$ as measured at a low temperature)(−30° C. using a notched specimen having a thickness of 4 mm according to ISO 180/1A. Within this range, balance of all physical properties and mechanical strength can be excellent.

The thermoplastic resin composition can have a tensile strength of preferably 140 MPa or more, more preferably 145 MPa or more, still more preferably 145 to 170 MPa, still more preferably 148 to 160 MPa as measured at a speed of 50 mm/min according to ISO 527. Within this range, balance of all physical properties and mechanical strength can be excellent.

The thermoplastic resin composition can have an elongation of preferably 1% or more, more preferably 2% or more, still more preferably 2 to 4%, still more preferably 2.5 to 4% as measured at a speed of 50 mm/min according to ISO 527. Within this range, balance of all physical properties and mechanical strength can be excellent.

The thermoplastic resin composition can have a flexural strength of preferably 180 MPa or more, more preferably 185 MPa or more, still more preferably 185 to 210 MPa, still more preferably 190 to 205 MPa as measured at a span of 64 mm and a speed of 2 mm/min using a specimen having a thickness of 4 mm according to ISO 178. Within this range, balance of all physical properties and mechanical strength can be excellent.

The thermoplastic resin composition can have a flexural modulus of preferably 8,000 MPa or more, more preferably 8,100 MPa or more, still more preferably 8,100 to 10,000 MPa, still more preferably 8,200 to 9,500 MPa as measured at a span of 64 mm and a speed of 2 mm/min using a specimen having a thickness of 4 mm according to ISO 178. Within this range, balance of all physical properties and mechanical strength can be excellent.

The thermoplastic resin composition can have a density of preferably 1.48 g/cm$^3$ or less, more preferably 1.44 to 1.48 g/cm$^3$, still more preferably 1.44 to 1.47 g/cm$^3$ as measured according to ISO 1183-1. Within this range, physical property balance can be excellent, and weight reduction can be achieved.

Method of Preparing Thermoplastic Resin Composition

A method of preparing the thermoplastic resin composition of the present invention includes a step of melt-kneading and extruding, at 200 to 300° C. and 100 to 300 rpm, 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$). In this case, heat resistance, fluidity, and mechanical properties such as impact strength, tensile strength, flexural strength, and flexural modulus can be excellent, and thus, the thermoplastic resin composition can be applicable to manufacture of automotive exterior materials and parts for automotive electric/electronic equipment.

For example, the kneading and extrusion can be performed using a single-screw extruder, a twin-screw extruder, and a Banbury mixer. In this case, the composition can be uniformly distributed, and thus compatibility can be excellent.

For example, the kneading and extrusion can be performed at a barrel temperature of 200 to 300° C., preferably 230 to 280° C., more preferably 250 to 270° C. In this case, throughput per unit time can be excellent, and thermal decomposition of resin components can be prevented.

For example, the kneading and extrusion can be performed at a screw rotation rate of 100 to 300 rpm, preferably 150 to 300 rpm, more preferably 200 to 300 rpm, still more preferably 230 to 270 rpm. In this case, throughput per unit time and process efficiency can be excellent, and excessive cutting of glass fiber can be prevented.

For example, the thermoplastic resin composition obtained by extrusion can be made into pellets using a pelletizer.

Molded Article

For example, a molded article of the present invention includes the thermoplastic resin composition of the present invention. In this case, heat resistance, fluidity, and mechanical properties such as impact strength, tensile strength, flexural strength, and flexural modulus can be excellent, and thus, the molded article can be suitable for automotive exterior materials and parts for automotive electric/electronic equipment.

The molded article can be preferably an automotive exterior material or a part for automotive electric/electronic equipment. In this case, heat resistance, fluidity, and mechanical properties such as impact strength, tensile strength, flexural strength, and flexural modulus can be excellent.

A method of manufacturing the molded article preferably includes a step of preparing pellets by melt-kneading and extruding, at 200 to 300° C. and 100 to 300 rpm, 35 to 50 by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) including 23 to 35% by weight of a vinyl cyanide compound; 7 to 12% by weight of an aromatic vinyl compound-vinyl cyanide compound copolymer (D) including 26 to 40% by weight of a vinyl cyanide compound; and 20 to 37% by weight of glass fiber (E) including 50 to 70% by weight of silica ($SiO_2$) and a step of injecting the pellets using an injection machine. In this case, physical property balance and injection processability can be excellent.

In describing the thermoplastic resin composition of the present invention, the method of preparing the same, and the molded article including the same, it should be noted that other conditions or equipment not explicitly described herein can be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications can be made without departing from the spirit and scope of the present invention, and such changes and modifications are also within the scope of the appended claims.

EXAMPLES

Materials used in Examples and Comparative Examples below are as follows.

A-1: Polybutylene terephthalate having an intrinsic viscosity of 0.8 dl/g

A-2: Polybutylene terephthalate having an intrinsic viscosity of 1.0 dl/g

A-3: Polybutylene terephthalate having an intrinsic viscosity of 0.7 dl/g

B-1: Polyethylene terephthalate homopolymer having an intrinsic viscosity of 0.8 dl/g B-2: Polyethylene terephthalate copolymer having an intrinsic viscosity of 0.8 dl/g C-1: Acrylate-styrene-acrylonitrile graft copolymer (graft copolymer obtained by graft-polymerizing 41% by weight of butyl acrylate rubber, 34% by weight of styrene, and 25% by weight of acrylonitrile, grafting degree: 35%)

C-2: Acrylate-styrene-acrylonitrile graft copolymer (graft copolymer obtained by graft-polymerizing 45% by weight of butyl acrylate rubber, 35% by weight of styrene, and 20% by weight of acrylonitrile, grafting degree: 45%)

D-1: Styrene-acrylonitrile copolymer (copolymer obtained by polymerizing 72% by weight of styrene and 28% by weight of acrylonitrile, weight average molecular weight: 130,000 g/mol)

D-2: Styrene-acrylonitrile copolymer (copolymer obtained by polymerizing 76% by weight of styrene and 24% by weight of acrylonitrile, weight average molecular weight: 120,000 g/mol)

E-1: Glass fiber (average length: 3 mm, average particle diameter: 14 μm) including 48% by weight of $SiO_2$, 12% by weight of $Al_2O_3$, 35% by weight of Cao, and 5% by weight of other components, including MgO E-2: Glass fiber (average length: 3 mm, average particle diameter: 10 μm) including 44% by weight of $SiO_2$, 14% by weight of $Al_2O_3$, 36% by weight of Cao, and 6% by weight of other components, including MgO E-3: Glass fiber (average length: 3 mm, average particle diameter: 10 μm) including 52% by weight of $SiO_2$, 18% by weight of $Al_2O_3$, 16% by weight of Cao, and 14% by weight of other components, including MgO F (phenol-based antioxidant): Pentaerythritol tetrakis(3-(3,5-di-tert-butyl-4-hydroxyphenyl) propionate)

G (polyethylene wax): LDPE Wax

H (transesterification inhibitor): Sodium phosphate monobasic (NaH$_2$PO$_4$)

Examples 1 to 11 and Comparative Examples 1 to 14

According to the contents and components shown in Tables 1 and 4, the components were fed into an extruder (42Ψ) and melt-kneaded and extruded at 260° C. and 250 rpm to prepare pellets. Then, the pellets were injected to prepare a specimen for measuring physical properties.

[Test Examples]

The properties of the specimens prepared in Examples 1 to 11 and Comparative Examples 1 to 14 were measured according to the following methods, and the results are shown in Tables 1 and 4 below.

Measurement Methods

Melt flow rate: Melt flow rate was measured at 260° C. under a load of 2.16 kg for 10 minutes according to ISO 1133. Here, the unit of melt flow rate is g/10 min.

Izod impact strength (KJ/m$^2$): Using a notched specimen having thickness of 4 mm, Izod impact strength was measured at 23° C. and −30° C. according to ISO 180/1A, respectively.

Tensile strength (MPa) and elongation (%): Tensile strength and elongation were measured at a speed of 50 mm/min according to ISO 527.

Flexural strength (MPa) and Flexural modulus (MPa): Using a specimen having a thickness of 4 mm, flexural strength and flexural modulus were measured at a span of 64 mm and a test speed of 2 mm/min according to ISO 178.

Heat deflection temperature (HDT, ° C.): Heat deflection temperature was measured under a load of 1.80 MPa (high load) and a load of 0.45 MPa (low load) according to ISO 75, respectively.

Density (g/cm$^3$): Density was measured according to ISO 1183-1.

TABLE 1

| Classification | Examples | | | | | |
|---|---|---|---|---|---|---|
| (wt %) | 1 | 2 | 3 | 4 | 5 | 6 |
| A-1 | 44.2 | 40.2 | 38.2 | 43.2 | 41.2 | 45.2 |
| A-2 | | | | | | |
| A-3 | | | | | | |
| B-1 | 9 | 13 | 13 | 11 | 11 | 13 |
| B-2 | | | | | | |
| C-1 | 8 | 8 | 8 | 7 | 9 | 8 |
| C-2 | | | | | | |
| D-1 | 8 | 8 | 10 | 8 | 8 | 8 |
| D-2 | | | | | | |
| E-1 | | | | | | |
| E-2 | | | | | | |
| E-3 | 30 | 30 | 30 | 30 | 30 | 25 |
| F | 0.4 | 0.4 | 0.4 | 0.4 | 0.4 | 0.4 |
| G | 0.3 | 0.3 | 0.3 | 0.3 | 0.3 | 0.3 |
| H | 0.1 | 0.1 | 0.1 | 0.1 | 0.1 | 0.1 |
| Physical properties | | | | | | |
| Melt flow rate (g/10 min) | 16.8 | 12.6 | 13.2 | 14.8 | 14.2 | 18.7 |
| IMP (23° C., KJ/m$^2$) | 8.3 | 8.5 | 8.6 | 7.5 | 9.6 | 8.1 |
| IMP (−30° C., KJ/m$^2$) | 7.4 | 7.5 | 7.4 | 6.3 | 8.2 | 7.0 |
| Tensile strength (MPa) | 147 | 150 | 149 | 148 | 148 | 140 |
| Elongation (%) | 2.2 | 2.5 | 2.5 | 2.4 | 2.5 | 2.8 |
| Flexural strength (MPa) | 193 | 191 | 188 | 192 | 191 | 184 |
| Flexural modulus (MPa) | 8,310 | 8,200 | 8,130 | 8,250 | 8,230 | 7,890 |
| HDT (1.80 MPa, ° C.) | 193 | 191 | 194 | 192 | 192 | 186 |
| HDT (0.45 MPa, ° C.) | 212 | 210 | 212 | 211 | 210 | 201 |
| Density (g/cm$^3$) | 1.46 | 1.46 | 1.46 | 1.46 | 1.46 | 1.41 |

TABLE 2

| Classification | Examples | | | | |
|---|---|---|---|---|---|
| (wt %) | 7 | 8 | 9 | 10 | 11 |
| A-1 | 35.2 | 42.2 | 38.2 | | 46.2 |
| A-2 | | | | | |
| A-3 | | | | 40.2 | |
| B-1 | 13 | 13 | 13 | 13 | 7 |
| B-2 | | | | | |
| C-1 | 8 | 8 | 8 | 8 | 8 |
| C-2 | | | | | |
| D-1 | 8 | 8 | 8 | 8 | 8 |
| D-2 | | | | | |
| E-1 | | | | | |
| E-2 | | | | | |
| E-3 | 35 | 28 | 32 | 30 | 30 |
| F | 0.4 | 0.4 | 0.4 | 0.4 | 0.4 |
| G | 0.3 | 0.3 | 0.3 | 0.3 | 0.3 |
| H | 0.1 | 0.1 | 0.1 | 0.1 | 0.1 |

TABLE 2-continued

| Classification (wt %) | Examples | | | | |
|---|---|---|---|---|---|
| | 7 | 8 | 9 | 10 | 11 |
| Physical properties | | | | | |
| Melt flow rate (g/10 min) | 10.2 | 15.0 | 11.1 | 15.6 | 17.5 |
| IMP (23° C., KJ/m$^2$) | 8.5 | 8.3 | 8.4 | 7.2 | 8.2 |
| IMP (−30° C., KJ/m$^2$) | 7.8 | 7.2 | 7.5 | 6.5 | 7.4 |
| Tensile strength (MPa) | 156 | 145 | 150 | 148 | 146 |
| Elongation (%) | 1.7 | 2.5 | 2.4 | 2.7 | 2.2 |
| Flexural strength (MPa) | 199 | 192 | 196 | 189 | 190 |
| Flexural modulus (MPa) | 8,650 | 8,180 | 8,450 | 8,170 | 8,150 |
| HDT (1.80 MPa, ° C.) | 197 | 191 | 194 | 190 | 194 |
| HDT (0.45 MPa, ° C.) | 218 | 210 | 213 | 209 | 213 |
| Density (g/cm$^3$) | 1.50 | 1.44 | 1.48 | 1.46 | 1.46 |

TABLE 3

| Classification (wt %) | Comparative Examples | | | | | |
|---|---|---|---|---|---|---|
| | 1 | 2 | 3 | 4 | 5 | 6 |
| A-1 | 40.2 | 40.2 | | 40.2 | 40.2 | 40.2 |
| A-2 | | | 40.2 | | | |
| B-1 | 13 | 13 | 13 | 13 | 13 | |
| B-2 | | | | | | 13 |
| C-1 | 8 | 8 | 8 | | 8 | 8 |
| C-2 | | | | 8 | | |
| D-1 | 8 | 8 | 8 | 8 | | 8 |
| D-2 | | | | | 8 | |
| E-1 | | 30 | | | | |
| E-2 | 30 | | | | | |
| E-3 | | | 30 | 30 | 30 | 30 |
| F | 0.4 | 0.4 | 0.4 | 0.4 | 0.4 | 0.4 |
| G | 0.3 | 0.3 | 0.3 | 0.3 | 0.3 | 0.3 |
| H | 0.1 | 0.1 | 0.1 | 0.1 | 0.1 | 0.1 |
| Physical properties | | | | | | |
| Melt flow rate (g/10 min) | 12.8 | 12.3 | 8.2 | 12.4 | 12.7 | 15.1 |
| IMP (23° C., KJ/m$^2$) | 8.3 | 8.1 | 9.2 | 6.3 | 8.2 | 8.6 |
| IMP (−30° C., KJ/m$^2$) | 7.6 | 7.2 | 8.1 | 5.2 | 7.3 | 7.7 |
| Tensile strength (MPa) | 142 | 143 | 148 | 149 | 148 | 149 |
| Elongation (%) | 2.3 | 2.4 | 3.0 | 2.2 | 2.4 | 2.6 |
| Flexural strength (MPa) | 183 | 184 | 180 | 189 | 190 | 188 |
| Flexural modulus (MPa) | 7,830 | 7,850 | 8,010 | 8,120 | 8,070 | 7,950 |
| HDT (1.80 MPa, ° C.) | 183 | 181 | 188 | 189 | 183 | 186 |
| HDT (0.45 MPa, ° C.) | 201 | 198 | 207 | 208 | 201 | 205 |
| Density (g/cm$^3$) | 1.46 | 1.47 | 1.46 | 1.47 | 1.46 | 1.46 |

TABLE 4

| Classification (wt %) | Comparative Examples | | | | | | | |
|---|---|---|---|---|---|---|---|---|
| | 7 | 8 | 9 | 10 | 11 | 12 | 13 | 14 |
| A-1 | 43.2 | 43.2 | 38.2 | 36.2 | 37.2 | 49.2 | 55.2 | 30.2 |
| A-2 | | | | | | | | |
| B-1 | 13 | 13 | 13 | 17 | 9 | 1 | 13 | 13 |
| B-2 | | | | | | | | |
| C-1 | 5 | 8 | 10 | 8 | 8 | 8 | 8 | 8 |
| C-2 | | | | | | | | |
| D-1 | 8 | 5 | 8 | 8 | 15 | 11 | 8 | 8 |
| D-2 | | | | | | | | |
| E-1 | | | | | | | | |

TABLE 4-continued

| Classification | Comparative Examples | | | | | | | |
|---|---|---|---|---|---|---|---|---|
| (wt %) | 7 | 8 | 9 | 10 | 11 | 12 | 13 | 14 |
| E-2 | | | | | | | | |
| E-3 | 30 | 30 | 30 | 30 | 30 | 30 | 15 | 40 |
| F | 0.4 | 0.4 | 0.4 | 0.4 | 0.4 | 0.4 | 0.4 | 0.4 |
| G | 0.3 | 0.3 | 0.3 | 0.3 | 0.3 | 0.3 | 0.3 | 0.3 |
| H | 0.1 | 0.1 | 0.1 | 0.1 | 0.1 | 0.1 | 0.1 | 0.1 |
| Physical properties | | | | | | | | |
| Melt flow rate (g/10 min) | 12.7 | 13.4 | 12.4 | 10.5 | 14.2 | 14.6 | 17.1 | 7.9 |
| IMP (23° C., KJ/m$^2$) | 6.5 | 8.3 | 10.7 | 8.4 | 6.3 | 8.3 | 6.2 | 8.8 |
| IMP (−30° C., KJ/m$^2$) | 5.4 | 7.7 | 9.4 | 7.3 | 5.2 | 7.1 | 5.5 | 7.7 |
| Tensile strength (MPa) | 153 | 151 | 146 | 149 | 148 | 145 | 94 | 160 |
| Elongation (%) | 2.4 | 2.3 | 2.3 | 2.1 | 2.2 | 2.4 | 3.2 | 1.4 |
| Flexural strength (MPa) | 193 | 187 | 185 | 189 | 195 | 184 | 144 | 205 |
| Flexural modulus (MPa) | 8,440 | 8,020 | 7,890 | 8,010 | 8,420 | 7,850 | 4,680 | 8,850 |
| HDT (1.80 MPa, ° C.) | 189 | 187 | 191 | 181 | 198 | 197 | 169 | 199 |
| HDT (0.45 MPa, ° C.) | 208 | 201 | 210 | 199 | 216 | 214 | 209 | 218 |
| Density (g/cm$^3$) | 1.46 | 1.46 | 1.46 | 1.47 | 1.44 | 1.47 | 1.36 | 1.53 |

As shown in Tables 1 to 4, compared to Comparative Examples 1 to 14 out of the range of the present invention, Examples 1 to 11 according to the present invention exhibit excellent fluidity, mechanical properties, heat resistance, and density. Note that, Example 2 including polybutylene terephthalate (A-1) having an intrinsic viscosity of 0.8 dl/g exhibits fluidity, mechanical properties, and heat resistance superior to those of Example 10, and Examples 2 and 10 including polybutylene terephthalate having different intrinsic viscosity. Specifically, in the case of Comparative Examples 1 and 2 including the glass fiber (E) containing less than 50% by weight of silica (SiO$_2$), flexural modulus is low, and heat resistance is reduced at both high and low loads.

In addition, in the case of Comparative Example 3 including the polybutylene terephthalate resin (A) having an intrinsic viscosity of 1.0 dl/g, due to low melt flow rate, processability is poor. In the case of Comparative Example 4 including the acrylate-styrene-acrylonitrile graft copolymer (C) containing less than 23% by weight of acrylonitrile, Izod impact strength is low at both room and low temperatures.

In addition, in the case of Comparative Example 5 including the styrene-acrylonitrile copolymer (D) containing less than 26% by weight of acrylonitrile, heat deflection temperature is low under a low load of 0.45 MPa. In the case of Comparative Example 6 including the polyethylene terephthalate copolymer (B-2), mechanical properties, particularly flexural modulus, are deteriorated.

In addition, in the case of Comparative Example 7 including the acrylate-styrene-acrylonitrile graft copolymer (C) in an amount less than the range of the present invention, Izod impact strength is very low at both room and low temperatures. In the case of Comparative Example 9 including the graft copolymer (C) in an amount exceeding the range of the present invention, flexural modulus is low.

In addition, in the case of Comparative Example 8 including the styrene-acrylonitrile copolymer (D) in an amount less than the range of the present invention, due to low heat deflection temperature, especially under a low load, heat resistance is poor. In the case of Comparative Example 11 including the styrene-acrylonitrile copolymer (D) in an amount exceeding the range of the present invention, Izod impact strength is low at both room and low temperatures.

In addition, in the case of Comparative Example 10 including the polyethylene terephthalate homopolymer (B-1) in an amount exceeding the range of the present invention, due to low melt flow rate, processability is poor, and heat deflection temperature is reduced under a low load. In the case of Comparative Example 12 including the polyethylene terephthalate homopolymer (B-1) in an amount less than the range of the present invention, flexural modulus is reduced.

In addition, in the case of Comparative Example 13 including the glass fiber (E-3) in an amount less than the range of the present invention, at both room and low temperatures, mechanical properties such as Izod impact strength, tensile strength, flexural strength, and flexural modulus are deteriorated, and heat deflection temperature is low under a high load. In the case of Comparative Example 13 including the glass fiber (E-3) in an amount exceeding the range of the present invention, impact strength is low at both room and low temperatures, melt flow rate is reduced, and density is increased, which makes it difficult to realize weight reduction.

In conclusion, since the thermoplastic resin composition of the present invention includes the polybutylene terephthalate resin, the polyethylene terephthalate homopolymer, the acrylate-aromatic vinyl compound-vinyl cyanide compound graft copolymer containing a vinyl cyanide compound in a predetermined content, the aromatic vinyl compound-vinyl cyanide compound copolymer containing a vinyl cyanide compound in a predetermined content, and the glass fiber containing silica in a predetermined content in a predetermined content ratio, the thermoplastic resin composition has excellent heat resistance, fluidity, and mechanical properties such as impact strength, tensile strength, flexural strength, and flexural modulus, and thus is applicable to manufacture of automotive exterior materials and parts for automotive electric/electronic equipment. In addition to the thermoplastic resin composition, the present invention provides a method of preparing the thermoplastic resin composition and a molded article including the thermoplastic resin composition.

The invention claimed is:

1. A thermoplastic resin composition, comprising:
   35 to 50% by weight of a polybutylene terephthalate resin (A) having an intrinsic viscosity of 0.6 to 0.9 dl/g;
   5 to 15% by weight of a polyethylene terephthalate homopolymer (B);
   7 to 9% by weight of an acrylate-aromatic vinyl compound-vinyl cyanide compound graft copolymer (C) comprising 23 to 35% by weight of a vinyl cyanide compound;
   7 to 12% by weight of an aromatic vinyl compound-vinyl cyanide compound copolymer (D) comprising 26 to 40% by weight of a vinyl cyanide compound; and
   20 to 37% by weight of glass fiber (E) comprising 50 to 70% by weight of silica ($SiO_2$).

2. The thermoplastic resin composition according to claim 1, wherein the polyethylene terephthalate homopolymer (B) has an intrinsic viscosity of 0.6 to 1.2 dl/g.

3. The thermoplastic resin composition according to claim 1, wherein the acrylate-aromatic vinyl compound-vinyl cyanide compound graft copolymer is a graft copolymer comprising 23 to 35% by weight of a vinyl cyanide compound, 30 to 45% by weight of acrylate-based rubber containing an acrylate, and 25 to 40% by weight of an aromatic vinyl compound.

4. The thermoplastic resin composition according to claim 1, the thermoplastic resin composition further comprising 4.1 to 5.5% by weight of a vinyl cyanide compound based on a total weight thereof.

5. The thermoplastic resin composition according to claim 1, wherein the glass fiber (E) comprises 50 to 70% by weight of silica ($SiO_2$), 16 to 30% by weight of aluminum oxide ($Al_2O_3$), 5 to 25% by weight of calcium oxide (CaO), and 5 to 20% by weight other components comprising one or more selected from the group consisting of MgO, $Na_2O$, $K_2O$, $Li_2O$, $Fe_2O_3$, $B_2O_3$, and SrO.

6. The thermoplastic resin composition according to claim 1, wherein the glass fiber (E) has an average particle diameter of 3 to 25 μm and an average length of 1 to 15 mm.

7. The thermoplastic resin composition according to claim 1, the thermoplastic resin composition further comprising one or more selected from the group consisting of an antioxidant, a lubricant, and a transesterification inhibitor.

8. The thermoplastic resin composition according to claim 1, wherein the thermoplastic resin composition has a melt flow rate of 10 g/10 min or more as measured at 260° C. under a load of 2.16 kg according to ISO 1133.

9. The thermoplastic resin composition according to claim 1, wherein the thermoplastic resin composition has a notched Izod impact strength of 6 kJ/m$^2$ or more as measured at −30° C. using a notched specimen having a thickness of 4 mm according to ISO 180/1A.

10. A method of preparing a thermoplastic resin composition, comprising melt-kneading and extruding, at 200 to 300° C. and 100 to 300 rpm, 35 to 50% by weight of a polybutylene terephthalate resin (A) having an intrinsic viscosity of 0.6 to 0.9 dl/g; 5 to 15% by weight of a polyethylene terephthalate homopolymer (B); 7 to 9% by weight of an acrylate-aromatic vinyl compound-vinyl cyanide compound graft copolymer (C) comprising 23 to 35% by weight of a vinyl cyanide compound; 7 to 12% by weight of an aromatic vinyl compound-vinyl cyanide compound copolymer (D) comprising 26 to 40% by weight of a vinyl cyanide compound; and 20 to 37% by weight of glass fiber (E) comprising 50 to 70% by weight of silica ($SiO_2$).

11. A molded article, comprising the thermoplastic resin composition according to claim 1.

12. The molded article according to claim 11, wherein the molded article is an automotive exterior material or a part for automotive electric/electronic equipment.

* * * * *